United States Patent [19]

Hannan

[11] 4,404,594
[45] Sep. 13, 1983

[54] IMAGING SYSTEM WITH ENLARGED DEPTH OF FIELD

[75] Inventor: William J. Hannan, Concord, Mass.

[73] Assignee: Itek Corporation, Lexington, Mass.

[21] Appl. No.: 317,363

[22] Filed: Nov. 2, 1981

[51] Int. Cl.³ .................... H04N 5/30; H04N 3/08; H04N 3/14

[52] U.S. Cl. ............................ 358/209; 358/206; 358/213; 358/227

[58] Field of Search ............... 358/109, 181, 183, 209, 358/212, 213, 227, 206

[56] References Cited

FOREIGN PATENT DOCUMENTS 2010631 6/1979 United Kingdom ............... 358/181

*Primary Examiner*—John C. Martin
*Attorney, Agent, or Firm*—Homer O. Blair; Gerald H. Glanzman; Robert L. Nathans

[57] ABSTRACT

An imaging system with an enlarged depth of field for use with a means for focusing an image, including: means for sensing an image sample from each of a plurality of portions of the image at each of a plurality of optical distances from the means for focusing; means for determining the relative focus of the image samples derived from a portion of the image at each of the plurality of distances; and means responsive to the means for determining for choosing, for each of the plurality of portions of the image, the image sample having a desired focus.

20 Claims, 5 Drawing Figures

IMAGING SYSTEM WITH ENLARGED DEPTH OF FIELD

FIELD OF INVENTION

This invention relates to an imaging system with an enlarged depth of field, and more particularly to such an imaging system in which an image sample is sensed from a given portion of an image at each of a plurality of optical distances from the means for focusing such an image and the image sample having a desired focus is chosen for that given portion of the image.

BACKGROUND OF INVENTION

According to well-known optical principles, when a lens focuses light from objects which are located at different distances from the lens, the image produced of each such object on the opposite side of the lens has its sharpest focus at a different distance from the lens. In traditional cameras in which a photodetector, such as an area of photographic film or an array of electronic sensors, is placed at one given distance from the lens, this creates a problem because it is impossible for the one distance of the photodetector from the lens to coincide with the different distance from the lens at which the images of different objects are in sharpest focus. This phenomenon has given rise to the concept of depth of field.

The depth of field of a camera defines the range of distance from the camera at which different objects may be located and still be focused with clarity in the same image. In traditional cameras, depth of field results from the fact that although a given portion of an image is in sharpest focus only at one specific distance from the focusing lens, it is in relatively clear focus over a range of distance on both sides of that specific distance, and the greater the depth of field is the greater that range is. Thus even through the distance from a lens at which two separate objects are in sharpest focus may differ, if there is a distance from the lens at which their images are both in relatively clear focus, a photodetector, such as a piece of film, placed at that distance can obtain a clear image of both objects.

The depth of field of an optical system is determined by well-known optical laws which relate to factors such as the F-stop of the lens used in such a system, the brightness of the objects being focused, the sensitivity of the film or photodetectors sensing the focused image, the motion of the image, and lens quality. Thus, when attempting to focus objects placed at different distances from a lens, a depth of field sufficient to produce a clear image of all such objects can often be achieved by using bright scene illumination which enables a camera to be operated at a high F-number. However, there are many situations in which it is not possible to achieve a desired depth of field with traditional cameras. For example, one of the objects to be focused may be dimly lit and too far away to permit adequate illumination to operate a camera at an F-number which would provide the depth of field necessary to focus both it and the other nearer objects. Even when it is physically possible to provide sufficient illumination to operate with an adequate F-number, it may not be desirable to do so since such illumination may consume considerable energy, may require bulky equipment, may produce unpleasant heat and brightness, and may make it difficult to photograph a scene without drawing attention.

SUMMARY OF INVENTION

It is therefore an object of this invention to provide an imaging system with enlarged depth of field.

It is a further object of this invention to provide such a system which obtains a desired image focus for each portion of an image.

It is a further object of this invention to provide such a system which obtains the optimum image focus even though the various objects within the image are at different distances and may be still or moving at different speeds.

It is a further object of this invention to provide such a system which obtains the optimum image focus even though the various objects within the image are at different distances and are dimly lit.

This invention results from the realization that the depth of field of a camera can be enlarged by sensing an image sample from each portion of an image at each of a plurality of optical distances from the camera's lens and then selecting the image sample from each such portion of the image which has the desired focus.

This invention features an imaging system with an enlarged depth of field for use with a means for focusing an image. The imaging system comprises means for sensing an image sample from each of a plurality of portions of the image at each of a plurality of optical distances from the means for focusing. The system also includes means for determining the relative focus of the image samples derived from a portion of the image at each of the plurality of distances, and means responsive to the means for determining relative focus for each of the plurality of portions of the image, for choosing the image sample having a desired focus.

In a preferred embodiment the means for sensing includes means for varying the distance between the plane of focus of an image and an array of sensors. This means for establishing a plurality of relative positions includes means for scanning the image in a first direction and an array of sensors extending transversely to the first direction for sensing a line of elements of the image at a time. The means for determining includes means, responsive to the array of sensors, for comparing the sensor outputs, representing image elements from a given portion of the image, produced at the plurality of positions. The means for choosing includes means, responsive to the means for comparing, for selecting the output representing the best focus for that given image portion. There may also be included means for accumulating the image element outputs representing the best focus for each portion of the image, which may include storage means for storing those best focused outputs and a display device for displaying them or just the display device.

The means for scanning may include means for moving the image across the array of sensors. The means for scanning may also include means for shifting the plane of focus of the image relative to the array of sensors. The array of sensors may include a plurality of linear arrays of sensors, each of which linear arrays is at a different level relative to the focus of the image and extends transversely to the first direction of the scan. The linear arrays are arranged adjacently to one another along the first direction.

The means for comparing may include delay means for providing the outputs representing image elements from a portion of the image from each of the linear arrays simultaneously. The means for comparing may further include high pass filter means responsive to the delay means for blocking low-frequency portions of the outputs and passing the high-frequency portions which represent the high spatial frequency detail necessary for sharp focus. The means for comparing may further include comparator means, responsive to the high-pass filter means, for determining which of the outputs representing a particular image element is in best focus. The means for selecting may include simply gating means reponsive to the comparator means for transmitting the output representing the best focussed image element from a portion of the image.

The array of sensors may include a single linear array of sensors and means for moving that linear array to a number of different levels relative to the plane of focus of the image. The means for comparing may include means for storing each of the outputs representing each image portion at each of those levels, and may also include high-pass filter means responsive to the means for storing for blocking low-frequency portions of the outputs. The means for comparing may also include comparator means responsive to the high-pass filter means for determining which of the outputs representing a portion of the image is in best focus, and the means for selecting may include gating means responsive to the comparator means for transmitting the output representing the best focused image elements from a portion of the image.

DISCLOSURE OF PREFERRED EMBODIMENT

Other objects, features and advantages will result from the following description of a preferred embodiment and the accompanying drawings, in which.

Figure 1:
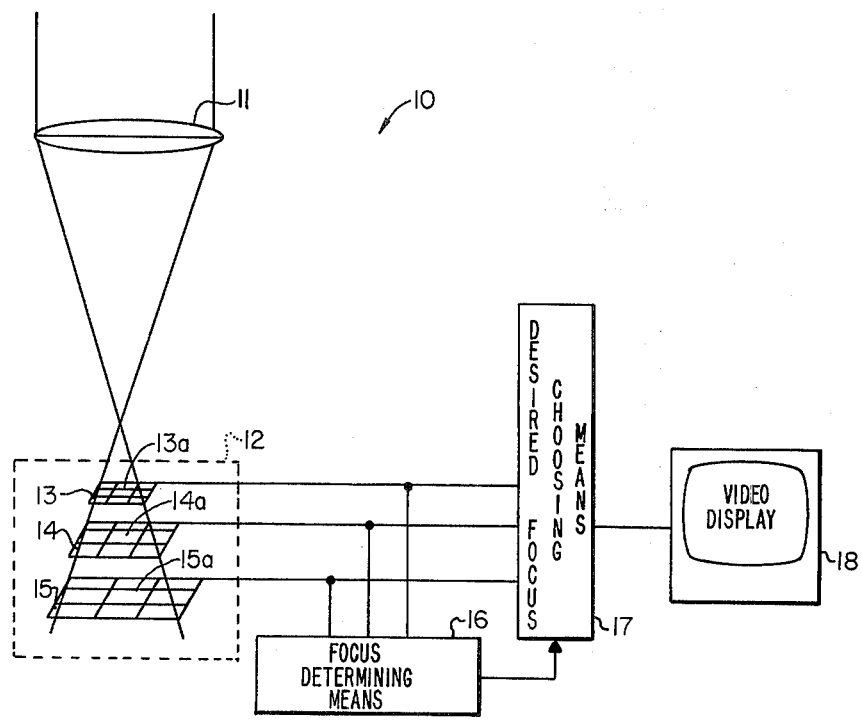
FIG. 1 is a diagrammatic representation of an imaging system according to this invention.

In FIG. 1 a diagrammatic representation of an imaging system 10 according to the present invention is shown. The system 10 includes a lens 11 for focusing an image of one or more objects. It also includes means 12, which is represented symbolically, for sensing an image sample, such as 13a, 14a and 15a, from each of a plurality of portions of the image focused by lens 12 at each of a plurality of optical distances, such as 13, 14, and 15, from lens 11. System 10 also includes means 16 for determining the relative focus of the image samples 13a, 14a and 15a derived from a portion of the image at each of the distances 13, 14, and 15. The system further includes means 17, which is responsive to the output of the focus determining means 16, for choosing, for each of the plurality of portions of the image focused by lens 12, the corresponding image sample drawn from one of the three levels 13, 14 or 15 which has a desired focus. These selected image samples can be combined to form a complete image, which can be shown on a video display 18, printed, or stored for further processing.

Normally it is desired to pick the image sample having the best focus for each portion of the image, so that a complete image comprised of optimally focused image elements can be formed. However, it would be within the scope of the present invention to use the focus-determining means 16 to select image elements which are out of focus when it would be desirable to do so.

Figure 2:
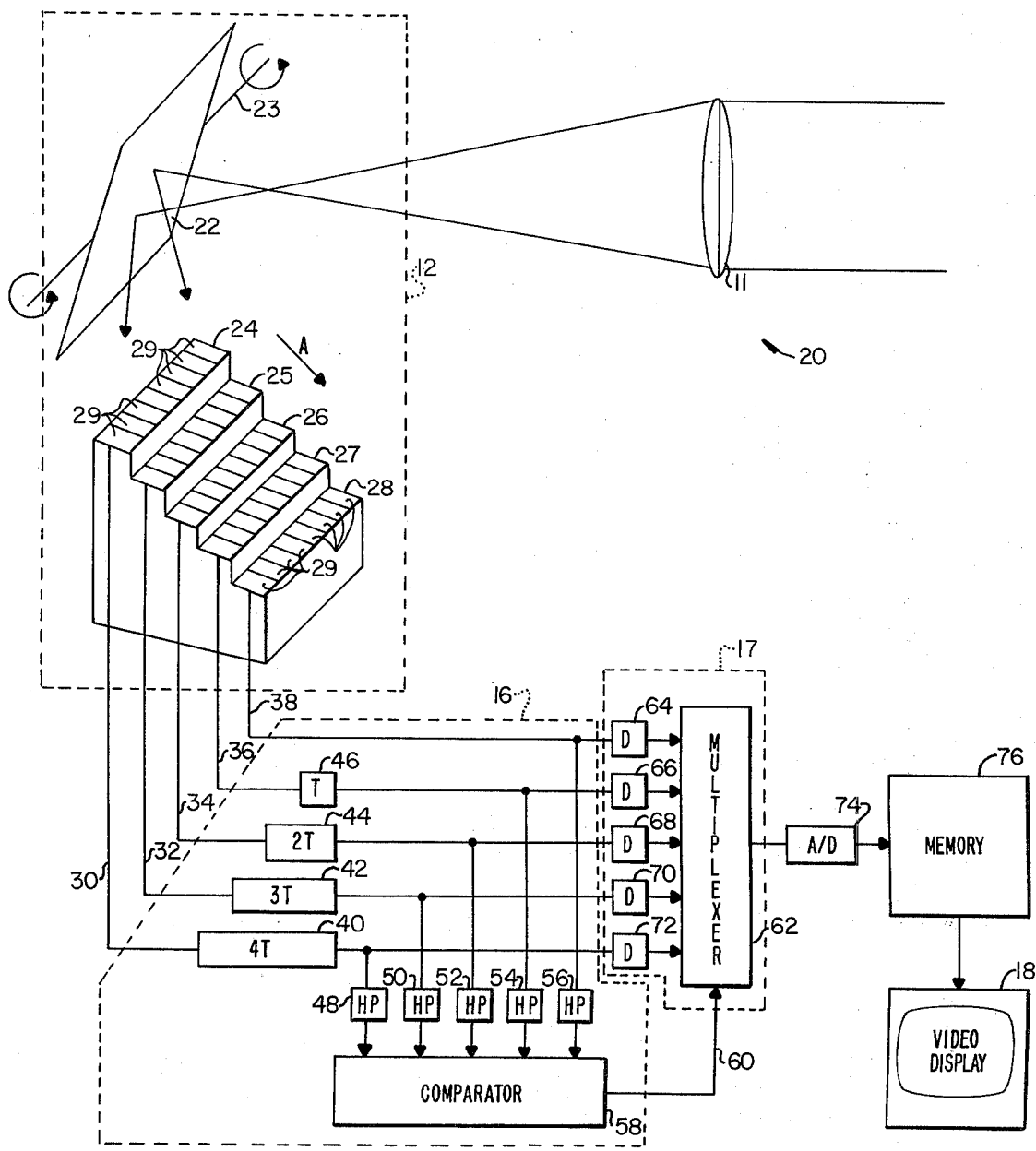
FIG. 2 is a diagrammatic representation of an imaging system according to one embodiment of the invention.

In FIG. 2 a diagrammatic representation of an imaging system 20, which is one possible embodiment of the imaging system 10 of FIG. 1, is shown. System 20 includes the lens 11 for focusing light from one or more objects. The light focused by lens 11 is projected onto a mirror 22 which is part of the sensing means 12 shown in dotted lines in FIG. 2. The mirror 22 is mounted to rotate about an axis 23. The light incident upon mirror 22 is reflected onto a plurality of linear sensor arrays 24–28, which are also part of the sensing means 12. Each of sensor arrays 24–28 is located at a different distance from the mirror 22, and each is comprised of a plurality of charge-coupled device (CCD) photodetectors 29. Each of CCD photodetectors 29 senses an image element from the image which is focused upon it. It does this by producing a charge packet which has an amount of charge proportional to the amount of light which is incident upon it. The photodetectors 29 in each sensor array are connected so that the image elements produced by all of the photodetectors 29 of a given array can be serially shifted out one of the linear arrays and a corresponding series of analog voltage levels can be supplied to output lines 30, 32, 34, 36, and 38 which are connected, respectively, to the linear arrays 24, 25, 26, 27 and 28.

Mirror 22 is designed to be repeatedly rotated about its axis 23, so that the light which is incident upon it from lens 11 scans across the plurality of linear sensor arrays 24–28 in the direction indicated by arrow A, which direction is transverse to the length of each of the sensor arrays 24–28. As a result, a given line of the optical image focused by lens 11 is first scanned across array 24, then across arrays 25, 26, 27 and 28. Since each of the arrays is located at a different distance from mirror 22, it is located at a different optical distance from the lens 11, that is, at a different distance along the path of the light focused by that lens. As a result, objects at different distances from lens 11 will have their images most clearly focused on different ones of the sensor arrays 24–28. It can be seen that the combination of the mirror 22 and the plurality of sensor arrays 24–28 provide means for establishing a plurality of relative positions between the plane of focus of the image focused by lens 11 and the one of sensor arrays 24–28 which senses a given line of that image as it is scanned along the direction indicated by arrow A.

The rate of rotation of the mirror 22 is controlled so that it takes a given line of the image focused by lens 11 a length of time T to move from one sensor array to the next. The timing at which the sensor arrays 24–28 shift their data out over their respective output lines 30, 32, 34, 36 and 38 is controlled so that each of sensor arrays 25, 26, 27 and 28 shifts out data at a time T after its preceding sensor array 24, 25, 26 and 27, respectively. The output lines 30, 32, 34 and 36 are connected to the inputs of delay circuits 40, 42, 44 and 46, respectively, which are part of the apparatus for comparing which constitute the determining means 16 shown in dotted lines in FIG. 2. The delay circuits 40–46 delay the serial output signals supplied to them by 4T, 3T, 2T, and T, respectively. Thus the serial outputs produced by each of the four highest sensor arrays 24, 25, 26, and 27 are delayed in circuits 40, 42, 44, and 46, respectively, by the amount of time it takes for a given line of the image to travel between each of those higher sensor arrays and the lowest sensor array 28. As a result, the outputs of delay circuits 40, 42, 44 and 46 are simultaneous with the output of the sensor array 28 on line 38. Thus when the output of the sensor array 28 representing an image element from a given portion of the image is fed to line 38, the corresponding image elements from the same portion of the image is supplied from each of the other sensor arrays 24-27 at the outputs of the delay circuits 40-46.

The apparatus for comparing which constitute the determining means 16 also includes five high-pass filters 48, 50, 52, 54, and 56 and a comparator 58. The analog signal on line 38 and that supplied at the output of each of the delay circuits 40-46 are each supplied through a separate one of the high-pass filters 48, 50, 52, 54 and 56 to the input of comparator 58. Each of these high-pass filters blocks the low-frequency components of the signal supplied to them and provides comparator 58 with the high-frequency components of that signal. Comparator 58 is designed to select from the signals supplied to it by the high-pass filters 48-56 the one which currently has the greatest high-frequency components. This is done because the intensity of the high-frequency components of a signal produced by a sensor array 24-28 indicates how rapidly the values of the image elements which it senses change as a function of distance along the length of that sensor array. This, in turn, indicates how sharply an image is focused upon that sensor array. Thus comparator 58 selects which of the signals produced by the sensor arays 24-28 is in best focus for each portion of an image line. Of course, if a portion of the image line focused upon a sensor array has no detail, but rather an extended area of one light level, comparator 58 will have trouble selecting which of the sensor arrays is in best focus, since there will be little or no high-frequency components to the signal produced by the sensor arrays. But in that situation it makes no difference whether or not the image is in focus, since there is no detail to be lost by being out of focus.

In imaging system 20 the desired focus choosing means 17, shown in dotted lines, includes apparatus for selecting the output of the sensor array 24-28 which is in best focus at any given time. This apparatus includes five delay circuits 64, 66, 68, 70 and 72 and a gating circuit, which is an analog multiplexer 62. The signal on output line 38 and that produced at the output of each of the delay circuits 40, 42, 44, and 46 are supplied through delay circuits 64, 66, 68, 70 and 72, respectively to the input of a gating circuit, analog multiplexer 62. Comparator 58 provides a digital signal over a data path 60 to the selecting input of multiplexer 62. This digital signal indicates which of the outputs from the sensor arrays 24-28 has the greatest high-frequency components for a given portion of an image line and thus which represents the most clearly-focused sample of that portion of the image line. This digital signal causes the multiplexer 62 to choose and transmit the output supplied to it which represents the best-focused image elements from a given portion of an image line. The delay circuits 64-72 are provided so that the high-pass filters 48-56, the comparator 58, and the multiplexer 62 have time to respond to a change in which of the outputs represents the best focus before that output is supplied to the multiplexer 62.

The analog output of multiplexer 62 is supplied through an analog-to-digital converter 74 to the input of a memory circuit 76, where it is stored in digital form. Memory 76 accumulates the image elements selected as representing the best focus for each portion of a given image line scanned across the sensor arrays 24-28. The operation of the sensor arrays 24-28, the delay circuits 40-46 and 64-72, the high-pass filters 48-56, the comparator 58, and the multiplexer 62 is repeated for a plurality of image lines until a whole image has been stored in memory 76. Once that is done the image stored in memory 76 can be shown on a video display device such as monitor 78, or it can be recorded on magnetic media or printed. In fact, since CCD shift registers can operate at very high speeds, it is possible that by causing mirror 22 to scan an image across sensor arrays 24-28 at the refresh frequency of video display 78, it would be possible to supply the output of multiplexer 62 directly to the input of the video display.

Figure 3:
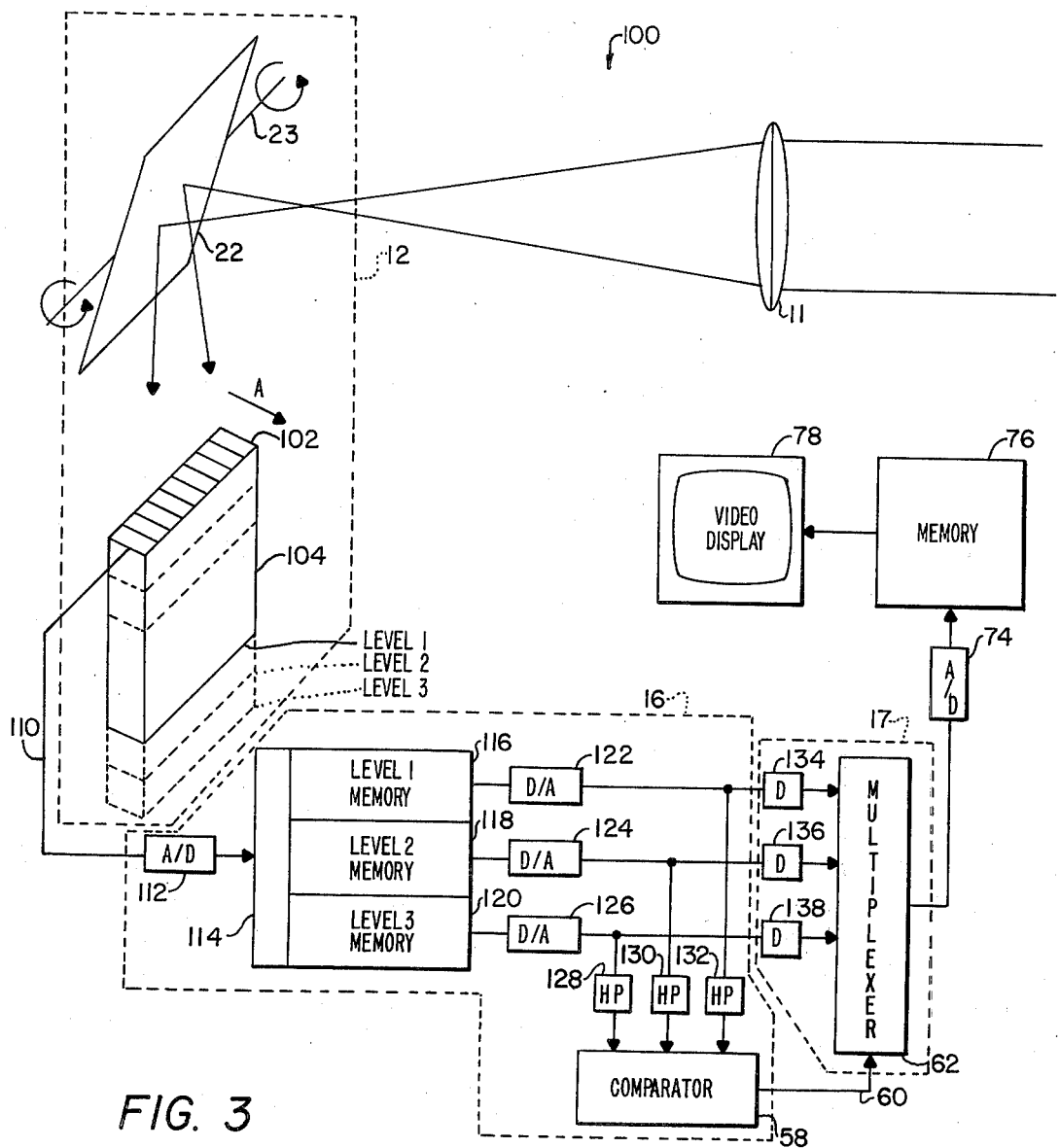
FIG. 3 is a diagrammatic representation of an imaging system according to another embodiment of the invention.
Figure 4:
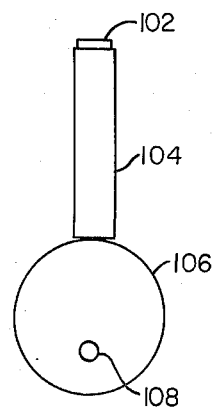
FIG. 4 is a diagrammatic representation of a mechanism for moving a linear array of sensors shown in FIG. 3.

In FIG. 3 an imaging system 100 is shown which is constructed according to another embodiment of the invention. In system 100 sensing means 12, shown in dotted lines, includes only one linear sensor array 102. Sensing means 12 establishes a plurality of relative positions between the plane of focus of lens 11 and the sensor array 102 by means for moving array 102 to a number of different levels relative to that plane of focus. In system 100 light focused by lens 11 is projected onto mirror 22. The light incident upon mirror 22 is reflected onto the single sensor array 102, which functions in the same manner as each of the sensor arrays 24-28 discussed above. Sensor array 102 is mounted on a base 104 which, in turn, is mounted to ride on top of a cam 106, shown in FIG. 4. Cam 106 is eccentrically mounted about its axis 108, so that sensor array 102 moves vertically, as shown in FIG. 3, as the cam is rotated. Thus sensor array 102 can be moved to a plurality of different levels relative to the plane of focus of the image reflected by mirror 22. Apparatus 100 is designed to have the sensor array 102 operate in three different levels: level 1, the highest, in which base 104 is shown in solid lines, and levels 2 and 3, in which the outlines of the top and bottom of base 104 are shown in dotted lines.

In the imaging system 100 the focus determining means 16, shown in dotted lines, includes apparatus for comparing the outputs produced by the sensor array 102 at each of its three levels. This comparing apparatus includes a memory circuit 114 having three separate memory divisions 116, 118 and 120, digital-to-analog (D/A) converters 122, 124 and 126, high-pass filters 128, 130 and 132, and a comparator 58.

The mirror 22 is designed to be repeatedly rotated about its axis 23 so that the light which is incident upon it from lens 11 scans across the sensor array 102 in the direction indicated by arrow A, which is transverse to the length of that sensor array. As a result, a plurality of image lines are successively scanned across array 102. After each image line is scanned across the array, the array shifts the analog voltages representing the image elements of that image line out through an output line 110 and through an analog-to-digital converter 112 to the input of a digital memory circuit 114. The memory circuit 114 contains enough storage capacity to store all the image elements of all of the image lines of a complete image at each of the three levels of the sensor array 102. Thus, when the cam 106 moves the sensor array 102 to level 1, the mirror 22 causes a complete image to be scanned across array 102. The array senses image elements from the image a line at a time, and causes those image elements to be stored in memory division 116, which is reserved for image elements recorded in level 1. Once the entire image has been sensed and recorded from level 1, the cam 106 moves sensor array 102 to level 2, at which time the mirror 22 again causes a complete image to be scanned across the array and the image elements sensed at that level to be stored in memory division 118. Once the entire image has been sensed and recorded from level 2, cam 106 moves array 102 to level 3, at which level the entire image is sensed again and is stored in memory division 120.

Once the outputs of sensor array 102 have been stored for each of the three levels, the memory circuit 114 causes the image element values stored in each of its three memory divisions 116, 118 and 120 to read out simultaneously, so that as a given image element from a given image line is read out of memory division 116, the corresponding image elements from the corresponding image line are read out from memory divisions 118 and 120. The digital image element values read out from memory divisions 116, 118 and 120 are supplied, respectively, to the inputs of D/A circuits 122, 124 and 126, which convert them to corresponding analog vlaues. The outputs of the D/A circuits 122, 124, and 126 are supplied through high-pass filters 128, 130 and 132, respectively, to the inputs of comparator 58, which determines which of the outputs supplied to it has the greatest high frequency components, and thus which of those outputs is in best focus.

The desired focus choosing means 17 of FIG. 3 is shown in dotted lines and it contains delay circuits 134, 136 and 138 and a gating circuit comprised of an analog multiplexing circuit 62. The outputs of the D/A circuits 122, 124 and 126 are supplied through delay circuits 134, 136 and 138, respectively, to the input of multiplexer 62. Comparator 58 provides a digital signal over data path 60 to select the input of multiplexer 62. This digital signal indicates which of th outputs from the memory divisions 116-120 has the greatest high-frequency components and, thus it causes multiplexer 62 to choose and transmit the output supplied to it which represents the best focused image elements sampled from each portion of the image. The delay circuits 134-138 are provided so that the high-pass filters 128-132, the comparator 58 and the multiplexer 62 have time to respond to a change in which of the outputs represents the best focus before that output is supplied to multiplexer 62.

The analog output of the multiplexer 62 is supplied through an analog-to-digital converter 74 to the input of a memory circuit 76, where it is stored in digital form. The memory 76 accumulates the image elements selected as representing the best focus for each portion of each image line, and it does this for an entire image. The image stored in memory 76 can then be shown on a video display device such as monitor 78, or it can be recorded on magnetic media or printed.

Figure 5:
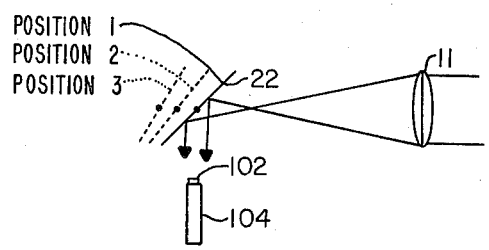
FIG. 5 is a diagrammatic representation of a means for shifting the plane of focus of an optical image relative to a linear array of sensors in yet another embodiment of the invention.

In FIG. 5 another embodiment of the invention is shown which is similar to that in FIG. 3 except that the optical distance between lens 11 and sensor array 102 is changed by moving mirror 22 rather than moving the sensor array 102. Moving mirror 22 along thre three positions shown in solid and dotted lines in FIG. 5 has the same effect as moving sensor array 102 among the three levels indicated in FIG. 3. It shifts the plane of focus of the image formed by lens 12a relative to sensor array 102 and allows a given portion of the image to have image elements sampled from it at each of a plurality of optical distances from lens 11.

Other embodiments will occur to those skilled in the art and are within the following claims:

What is claimed is:

1. An imaging system with an enlarged depth of field for use with a means for focusing an image, said imaging system comprising:

means for sensing an image sample from each of a plurality of portions of said image at each of a plurality of optical distances from said means for focusing, said means for sensing including means for scanning said image in a first direction, and a plurality of sensor means extending generally transverse to said first direction for sensing a line of image samples of said image at said plurality of optical distances;

means for determining the relative focus of the image samples derived from a portion of said image at each of said plurality of optical distances; and means, responsive to said means for determining, for choosing, for each of said plurality of portions of said image, the image sample having a desired focus.

2. The imaging system of claim 1 in which:

said plurality of sensor means includes an array of sensors, and said means for sensing further includes means for varying the distance between the plane of focus of an image and said array of sensors;

said means for determining includes means, responsive to said array of sensors, for comparing the sensor outputs, representing image elements from a given portion of said image produced at said plurality of positions; and said means for choosing includes means, responsive to said means for comparing, for selecting the output representing the best focus for that given image portion.

3. The imaging system of claim 2 further including means for accumulating the image element outputs representing the best focus for each portion of the image.

4. The imaging system of claim 3 in which said means for accumulating includes storage means.

5. The imaging system of claim 3 in which said means for accumulating includes a display device.

6. The imaging system of claim 2 in which said means for scanning includes means for moving said image across said array of sensors.

7. The imaging system of claim 2 in which said array of sensors includes a plurality of linear arrays of sensors, each said linear array being at a different level relative to the plane of focus of said image and extending transversely to said first direction, said linear arrays being arranged adjacently in said first direction.

8. The imaging system of claim 7 in which said means for comparing includes delay means for providing the outputs representing image elements from a portion of said image from each of said linear arrays simultaneously.

9. The imaging system of claim 8 in which said means for comparing includes high pass filter means, responsive to said delay means, for blocking low-frequency portions of said outputs.

10. The imaging system of claim 9 in which said means for comparing includes comparator means, responsive to said high pass filter means, for determining which of said outputs representing a portion of said image is in best focus.

11. The imaging system of claim 10 in which said means for selecting includes gating means, responsive to said comparator means, for transmitting said output representing the best focussed image elements from a said portion of said image.

12. The imaging system of claim 2 in which said array of sensors includes a linear array of sensors and means for moving said linear array to a number of different levels relative to the plane of focus of the image.

13. The imaging system of claim 12 in which said means for comparing includes means for storing each of the outputs representing each image portion at each said level.

14. The imaging system of claim 13 in which said means for comparing includes high pass filter means, responsive to said means for storing, for blocking low-frequency portions of the outputs.

15. The imaging system of claim 14 in which said means for comparing includes comparator means, responsive to said high pass filter means, for determining which of said outputs representing a portion of said image is in best focus.

16. The imaging system of claim 15 in which said means for selecting includes gating means, responsive to said comparator means, for transmitting said output representing the best focussed image elements from a portion of said image.

17. The imaging system of claim 2 in which said means for scanning includes means for shifting the plane of focus of the image relative to said array of sensors.

18. An imaging system with an enlarged depth of field comprising:
   means for varying the distance between the plane of focus of an image and an array of sensors including means for scanning said image in a first direction, and an array of sensors including a plurality of linear arrays of sensors extending transversely to said first direction for sensing a line of elements of the image at a time, each said linear array being at a different level relative to the focus of said image, said linear arrays of sensors being arranged adjacently in said first direction;
   means, responsive to said array of sensors, for comparing the sensor outputs, representing image elements from a portion of said image, produced at each of said levels; and
   means, responsive to said means for comparing, for selecting the output representing the best focus for that image portion.

19. An imaging system with an enlarged depth of field comprising:
   means for varying the distance between the plane of focus of an image and an array of sensors including means for scanning said image in a first direction, a linear array of sensors extending transversely to said first direction for sensing a line of elements of the image at a time, and means for moving said linear array to a number of different levels relative to the plane of focus of the image;
   means, responsive to said array of sensors, for comparing the sensor outputs, representing image elements from a portion of said image, produced at each of said levels; and
   means, responsive to said means for comparing, for selecting the output representing the best focus for that image portion.

20. An imaging system with an enlarged depth of field comprising:
   means for varying the distance between the plane of focus of an image and an array of sensors including means for scanning said image in a first direction, and
   an array of sensors extending transversely to said first direction for sensing a line of elements of the image at a time, said means for scanning including means for shifting the plane of focus of the image relative to said array of sensors;
   means, responsive to said array of sensors, for comparing the sensor outputs representing image elements from a portion of said image produced at said plurality of positions; and
   means, responsive to said means for comparing, for selecting the output representing the best focus for that image portion.

* * * * *